(12) United States Patent
Wu et al.

(10) Patent No.: US 7,594,450 B2
(45) Date of Patent: Sep. 29, 2009

(54) QUICK-RELEASING LINEAR ACTUATOR

(75) Inventors: Chou-Hsin Wu, Sindian (TW); Francois Ducourant, Sindian (TW); Guillaume Besnouln, Sindian (TW)

(73) Assignees: Jaeger Industrial Co., Ltd., Taipei (TW); AB SKF, Gothenburg (SE)

( * ) Notice: Subject to any disclaimer, the term of this patent is extended or adjusted under 35 U.S.C. 154(b) by 652 days.

(21) Appl. No.: 11/419,994

(22) Filed: May 23, 2006

(65) Prior Publication Data

US 2007/0144279 A1   Jun. 28, 2007

(30) Foreign Application Priority Data

Dec. 27, 2005   (TW) .............................. 94222711 U

(51) Int. Cl.
*F16H 27/02* (2006.01)
(52) U.S. Cl. .................. 74/89.38; 74/89.39; 74/424.78; 5/616
(58) Field of Classification Search ...................... 5/617, 5/616, 613, 618; 74/89.23, 89.38, 89.39, 74/424.78
See application file for complete search history.

(56) References Cited

U.S. PATENT DOCUMENTS

| | | | | |
|---|---|---|---|---|
| 4,159,813 A | * | 7/1979 | Yale | 242/480.8 |
| 5,329,657 A | * | 7/1994 | Bartley et al. | 5/617 |
| 7,047,834 B2 | * | 5/2006 | Nielsen et al. | 74/89.38 |
| 7,055,195 B2 | * | 6/2006 | Roussy | 5/616 |
| 2008/0210029 A1 | * | 9/2008 | Wang | 74/89.38 |

* cited by examiner

*Primary Examiner*—David M Fenstermacher

(57) ABSTRACT

A quick-releasing linear actuator suitable for electric hospital beds includes a motor, a transmission device, a clutch device and a pulling arm device. With the pulling of the pulling arm of the pulling arm device, a clutch and a clutch base of the clutch device can be disengaged, such that the screw of the transmission device will not be impeded by the worm gear. When a force is exerted to the telescopic rod of the transmission device, the screw can rotate by itself to rapidly lower the telescopic rod, thereby to achieve the rapid releasing of the hospital beds.

10 Claims, 7 Drawing Sheets

QUICK-RELEASING LINEAR ACTUATOR

BACKGROUND OF THE INVENTION

1. Field of the Invention

The present invention relates to a quick-releasing linear actuator, and in particular to a quick-releasing linear actuator suitable for an electric hospital bed.

2. Description of Prior Art

It is well known that linear actuators can be widely used in electric hospital beds, patient lifters, treadmills, and wheelchairs for adjusting positions. When a patient is subjected to emergent medical treatment or emergency situation like CPR—Cadio Pulmonary Resuscitation, a quick-releasing linear actuator is capable of quick changing and adjusting the position of the hospital bed, so that the most important time for rescuing the patient will not be wasted. Therefore, a linear actuator capable of quick releasing has become an important issue in this art. By An external damper or braking system or by the internal friction of the actuator, the speed or the time to release the actuator can be adjusted depending the demand of the application.

A conventional linear actuator mainly comprises a motor means, a transmission means and a pulling arm means. The motor means comprises a motor and a base connected to the motor. The motor is provided with a worm penetrating into the base. Further, the transmission means has a screw penetrating out of the base, a worm gear connected to one end of the screw and engaged with the worm inside the base, and a telescopic tube threadedly connected to the other end of the screw. The pulling arm means has a pulling arm connected to the worm gear. By pulling the pulling arm to pull out the engaging worm and worm gear, at this time, the screw can coaxially rotate with the worm gear so that an axial force can be exerted to the telescopic tube to make it to retract inwardly, thereby to quick release the hospital bed.

However, when in use, there are still some drawbacks existing in conventional linear actuators. Since the worm gear is positioned within the base and axially movable with respect to the screw, the space necessary for the base is larger, and thus the overall size of the linear actuator is greatly increased. Further, when the motor is out of order, the worm becomes immobile and locked, such that the pulling arm cannot pull out the worm gear along the screw, disenabling to function normally. Moreover, the action in which the pulling arm directly pulls the engaging worm and worm gear needs a lager pulling force, which easily causes a large movement or a large force incompatible with the emergency case like the CPR.

Therefore, in view of the above the drawbacks, the inventor proposes the present invention to overcome the above problems based on his expert experiences and deliberate researches.

SUMMARY OF THE INVENTION

The present invention is to provide a rapid-releasing linear actuator. With the pulling-of the pulling arm, the clutch and the clutch base can be disengaged, such that the screw of the transmission means will not be impeded by the worm gear. When an axial force is exerted to the telescopic rod of the transmission means, the screw can rotate by itself to rapidly lower the telescopic rod, thereby to achieve the rapid release.

The present invention provides a quick-releasing linear actuator suitable for electric hospital beds, which comprises:

a motor means comprising a motor and a base connected to the motor, wherein the motor is provided with a worm penetrating into the base;

a transmission means having a screw penetrating out of the base, a fixing sleeve connected to the screw, a worm gear connected to the fixing sleeve and engaged with the worm within the base, and a telescopic tube threadedly connected to the screw;

a clutch means provided within the base of the motor means, wherein the clutch means comprises a clutch base fixedly connected to the screw and a clutch connected to the fixing sleeve and axially movable with respect to the fixing sleeve; and a pulling arm means comprising a pulling arm pivotably connected to the outside of the base of the motor means, wherein the pulling arm is provided with poking portions corresponding to the clutch for controlling the clutching action between the clutch and the clutch base.

DETAILED DESCRIPTION OF THE INVENTION

The detailed description and the technical contents of the present invention will be explained with reference to the accompanying drawings. However, it should be understood that the drawings are illustrative but not used to limit the scope of the present invention.

Figure 1:
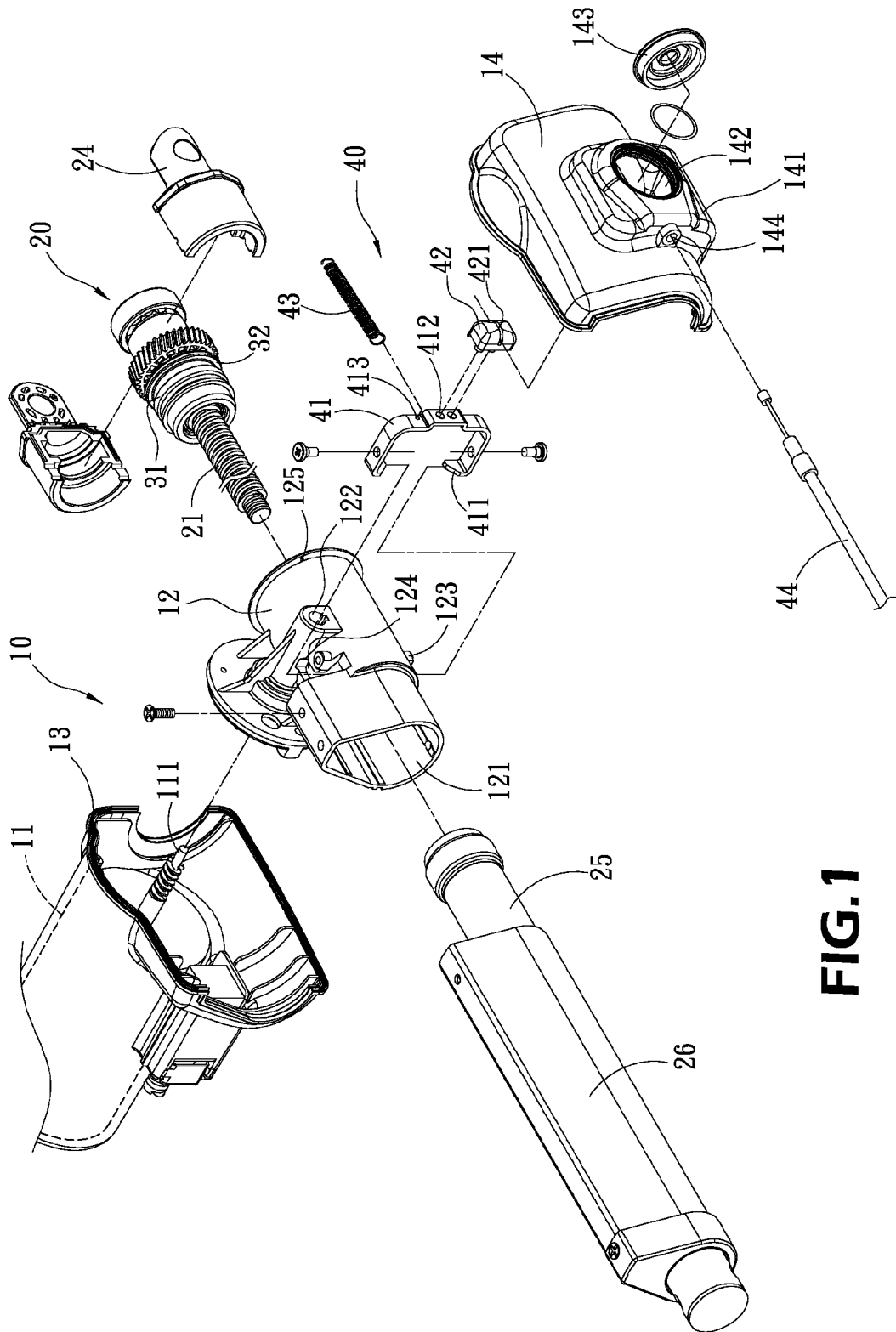
FIG. 1 is an exploded perspective view of the present invention.
Figure 2:
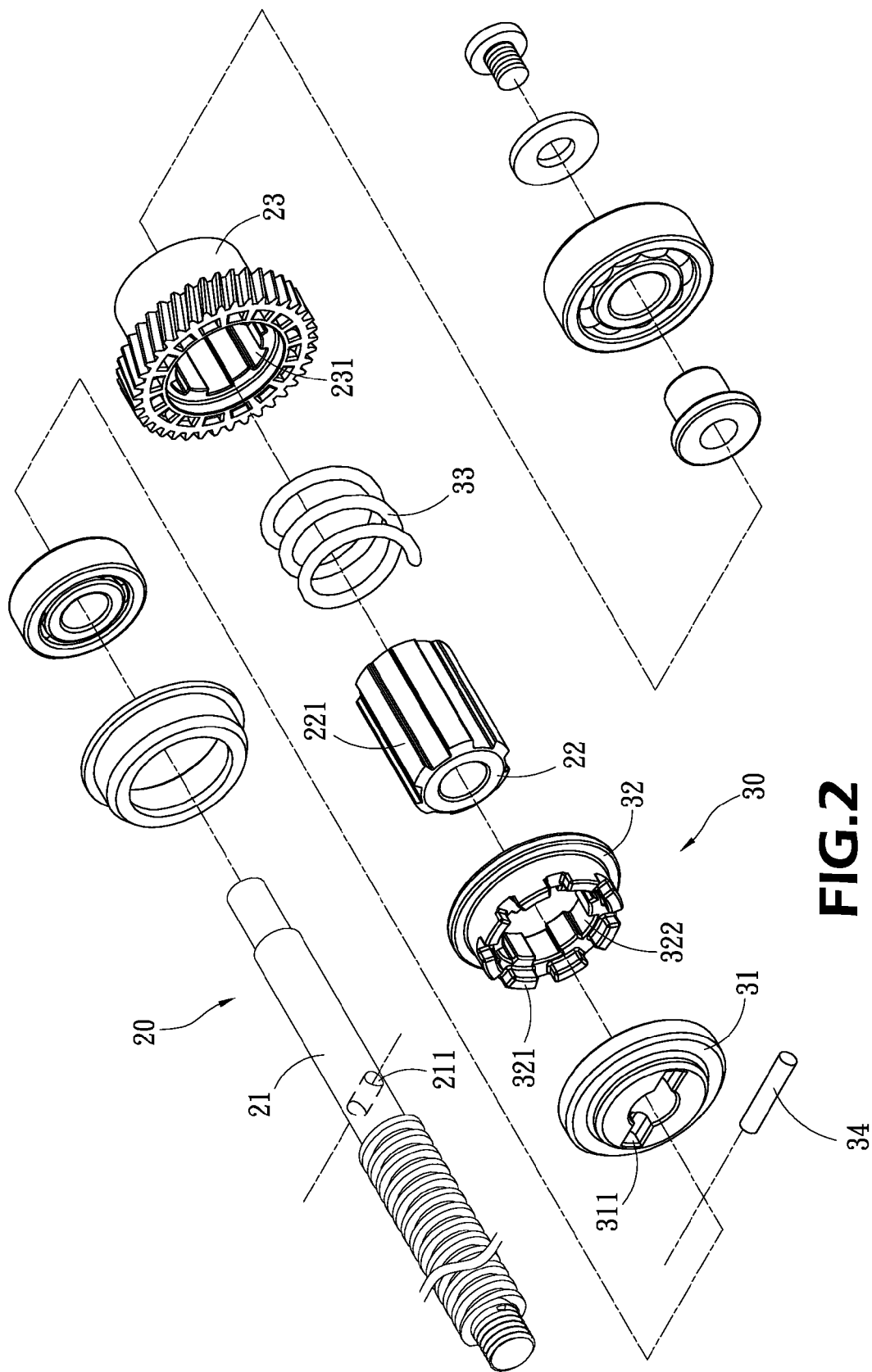
FIG. 2 is an exploded perspective showing the transmission means and the clutch means of the present invention.
Figure 3:
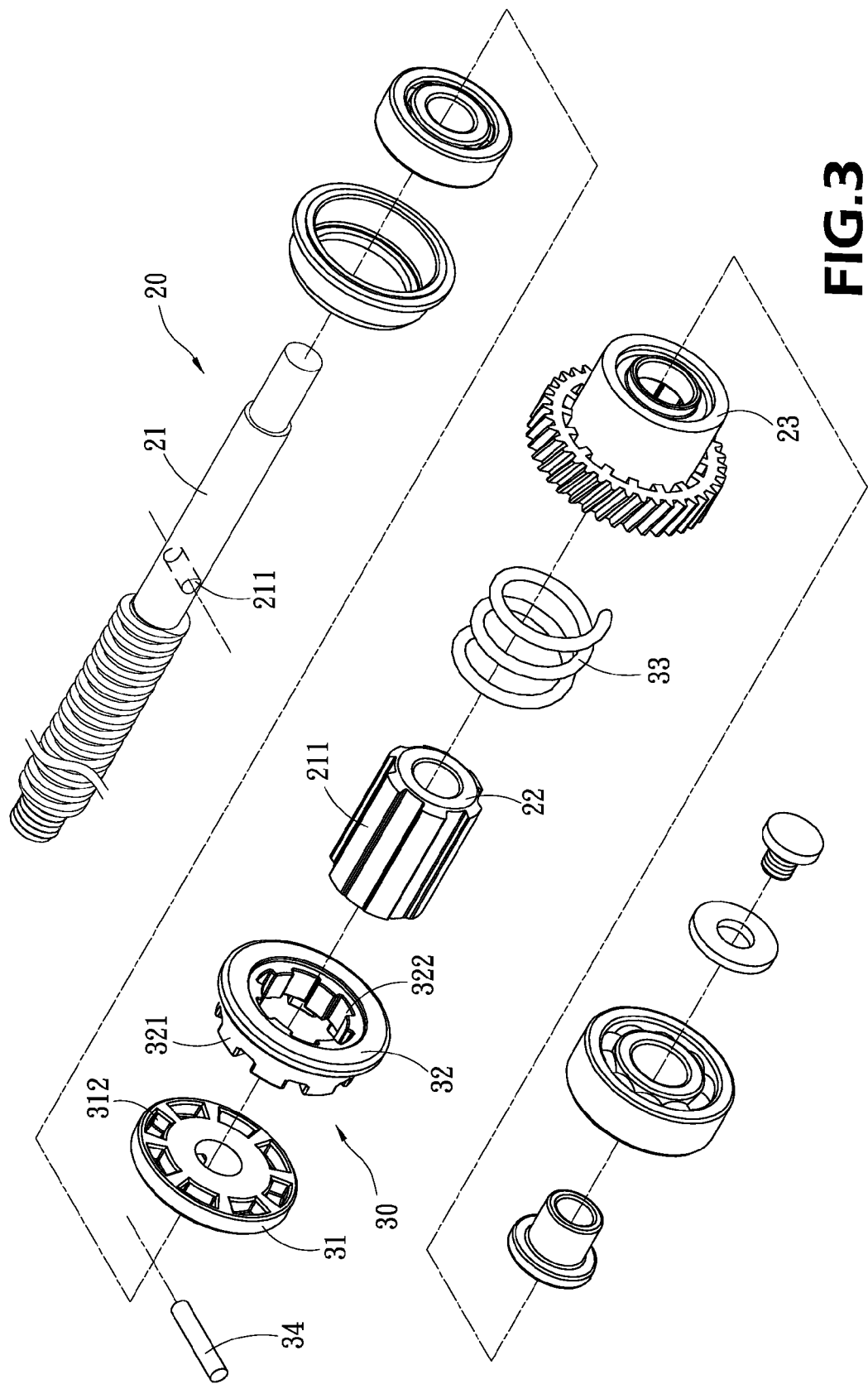
FIG. 3 is a view of FIG. 2 seen from another view angle.
Figure 4:
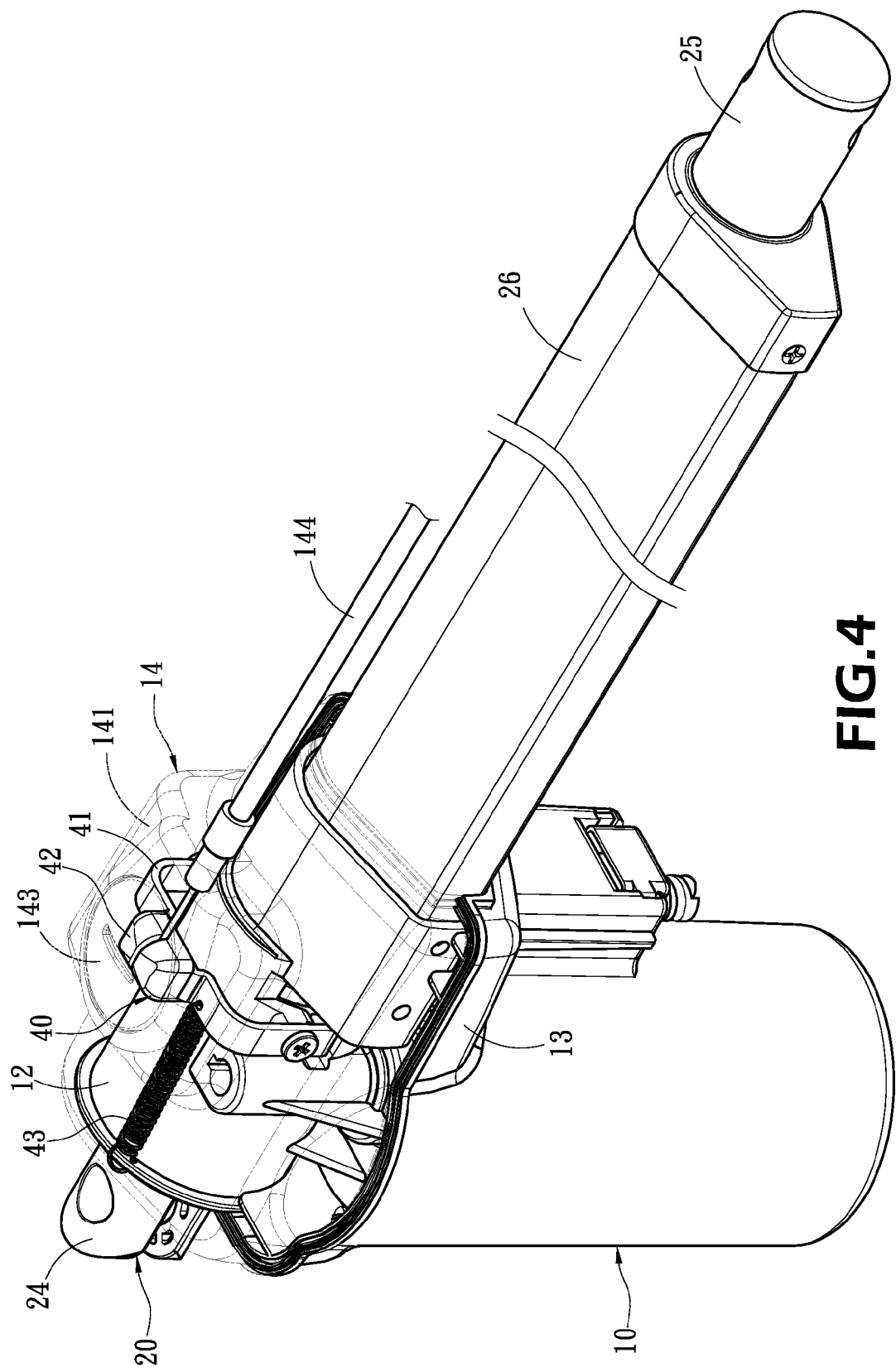
FIG. 4 is a schematic view showing the assembling of the present invention.

FIG. 1 is an exploded perspective view of the present invention. FIG. 2 is an exploded perspective showing the transmission means and the clutch means of the present invention. FIG. 3 is a view of FIG. 2 seen from another view angle. FIG. 4 is a schematic view showing the assembling of the present invention. The present invention provides a quick-releasing linear actuator comprising a motor means 10, a transmission means 20, a clutch means 30 and a pulling arm means 40.

The motor means 10 comprises a motor 11 and a base 12 connected to the motor 11. A lower cover 13 and an upper cover 14 are covered in the exterior of the motor 11 and the base 12. A worm 111 is extended from the center of the motor 11. The base 12 is provided with a hollow accommodating chamber 121. The top of the hollow accommodating chamber is provided with a transverse shaft hole 122 in communication with the accommodating chamber 121. The shaft hole 122 is adapted to be penetrated and connected by the worm 111. In the front of the shaft hole 122, upper and lower longitudinal screw holes 123 are respectively provided to correspond to each other. The inside of the screw holes 123 are provided with grooves 123, respectively. The flange in the rear of the base 12 is provided with a through hole 125. A projecting portion 141 is formed on the top of the upper cover 14. A through hole 142 is provided in the center of the projecting portion 141. The through hole 142 is adapted to be covered with a cap 143. The front portion of the projecting portion 141 is provided with a penetrating hole 144.

The transmission means 20 has a screw 21 penetrating out of the base 12 of the motor means 10, a fixing sleeve 22 connected to the screw 21, and a worm gear 23 engaged with the worm 111 within the base 12. The front and rear ends of the screw 21 are connected to a support 24 and a telescopic tube 23, respectively. An outer tube 26 is covered on the outside of the telescopic tube 25. The outer tube 26 and one end of the support 24 are connected to both ends of the base 12 of the motor means 10. A radial hole 211 is provided in the screw 21 adjacent to the threads. The outer periphery of the fixing sleeve 22 is provided with a plurality of first projecting blocks 221. The center of the worm gear 23 is provided with a plurality of first grooves 231 corresponding to the first projecting blocks 221. Further, the outside of the fixing sleeve 22 and the worm gear 23 are provided with a bearing and a bearing shell for fixing and supporting the screw 21 within the base 12.

The clutch means 30 is received in the accommodating chamber 121 of the base 12, and comprises a clutch base 31 fixedly connected to the screw 21 and a clutch 32 connected to the fixing sleeve 22 and axially movable with respect to the fixing sleeve 22. An elastic element 33 is sandwiched between the facing end surfaces of the clutch 32 and the worm gear 23. The clutch base 31 is plate-shaped and provided with an elongated groove 311 inwardly recessed on the outside surface. An insertion pin 34 can be inserted into the radial hole 211 of the screw 21 and received in the elongated groove 311, thereby to fixedly connect the clutch base 31 to the screw 21. Further, the inside surface of the clutch base 31 is circumferentially provided with a plurality of second recesses 312 (as shown in FIG. 3). The outside surface of the clutch 32 is provided with a plurality of second projecting blocks 321 corresponding to the second recesses 312. The inner edge of the shaft center of the clutch 32 is provided with a plurality of third recesses 322 corresponding to the first projecting blocks 221 of the fixing sleeve 22. With the above arrangement, the clutch 32 can be axially movable with respect to the fixing sleeve 22. Further, the elastic element 33 can be a spiral compressing spring.

The pulling arm means 40 comprises a pulling arm 41 pivotably connected to the outside of the base 12 of the motor means 10, a fixing piece 42 fixedly connected to the pulling arm 41, and an elastic body 43 connected to the pulling arm 41 and the base 12 at both ends. The pulling arm 41 is formed into an inverted U-letter. The open end of the pulling arm has two poking portions 411, and the closed end thereof is provided with a through hole 412 and a fixing hole 413, respectively. The through hole 412 is adapted to be connected by the fixing piece 42. The back of the fixing piece 42 is provided with a groove 421 in which one end of a cable 44 can be inserted from the penetrating hole 144 of the upper cover 14 into the groove 421 of the fixing piece 42. Further, the elastic body 43 can be a spiral tension spring, and both ends thereof are connected to the fixing hole 413 and the through hole 125 of the base 12, respectively.

Figure 5:
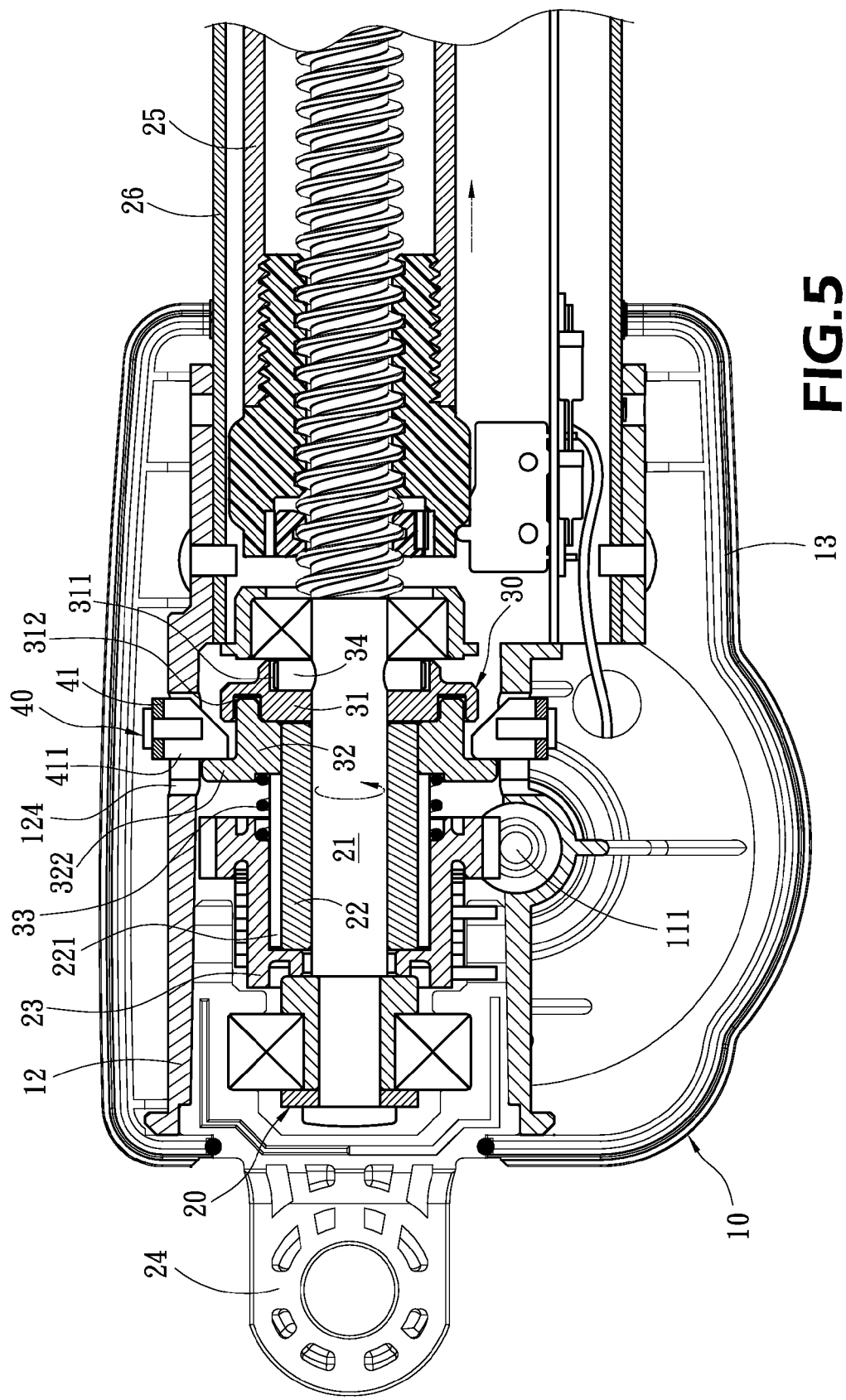
FIG. 5 is a view showing the action for outwardly extending the telescopic tube of the present invention.

FIG. 5 is a view showing the action for outwardly extending the telescopic tube of the present invention. With the combination of the above elements, the motor 11 is actuated to drive the worm 111 to rotate accordingly, and the worm gear 23 engaged with the transmission means 20 also rotates. In this way, the screw 21 is also driven to rotate, such that the telescopic tube 25 threadedly connected to one end of the screw can be linearly moved and outwardly extended. On the contrary, the reverse rotation of the motor 11 makes the telescopic tube 25 to linearly move and retracted inwardly into the outer tube 26.

Figure 6:
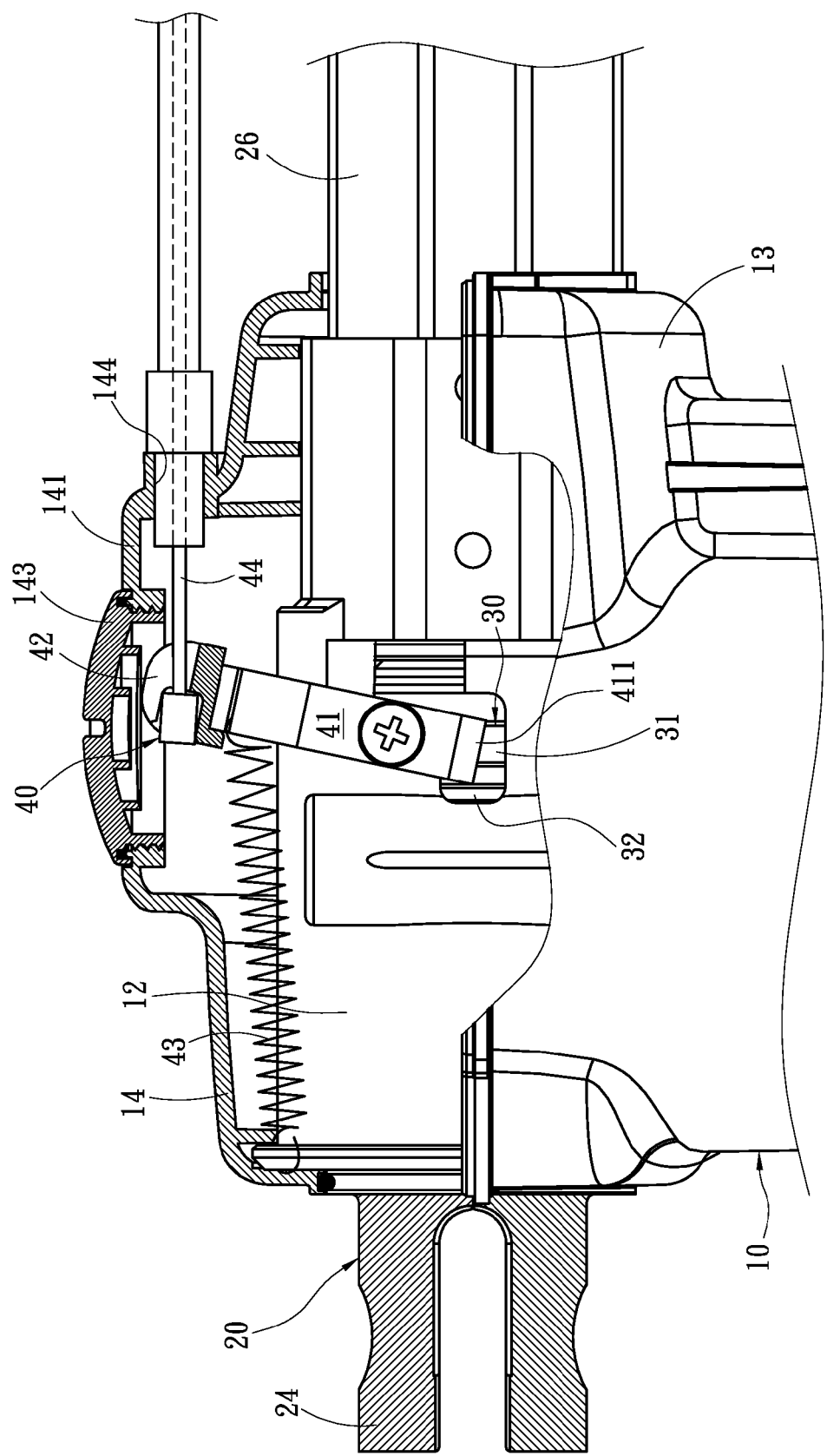
FIG. 6 is a view showing the action for pulling the pulling arm of the present invention.
Figure 7:
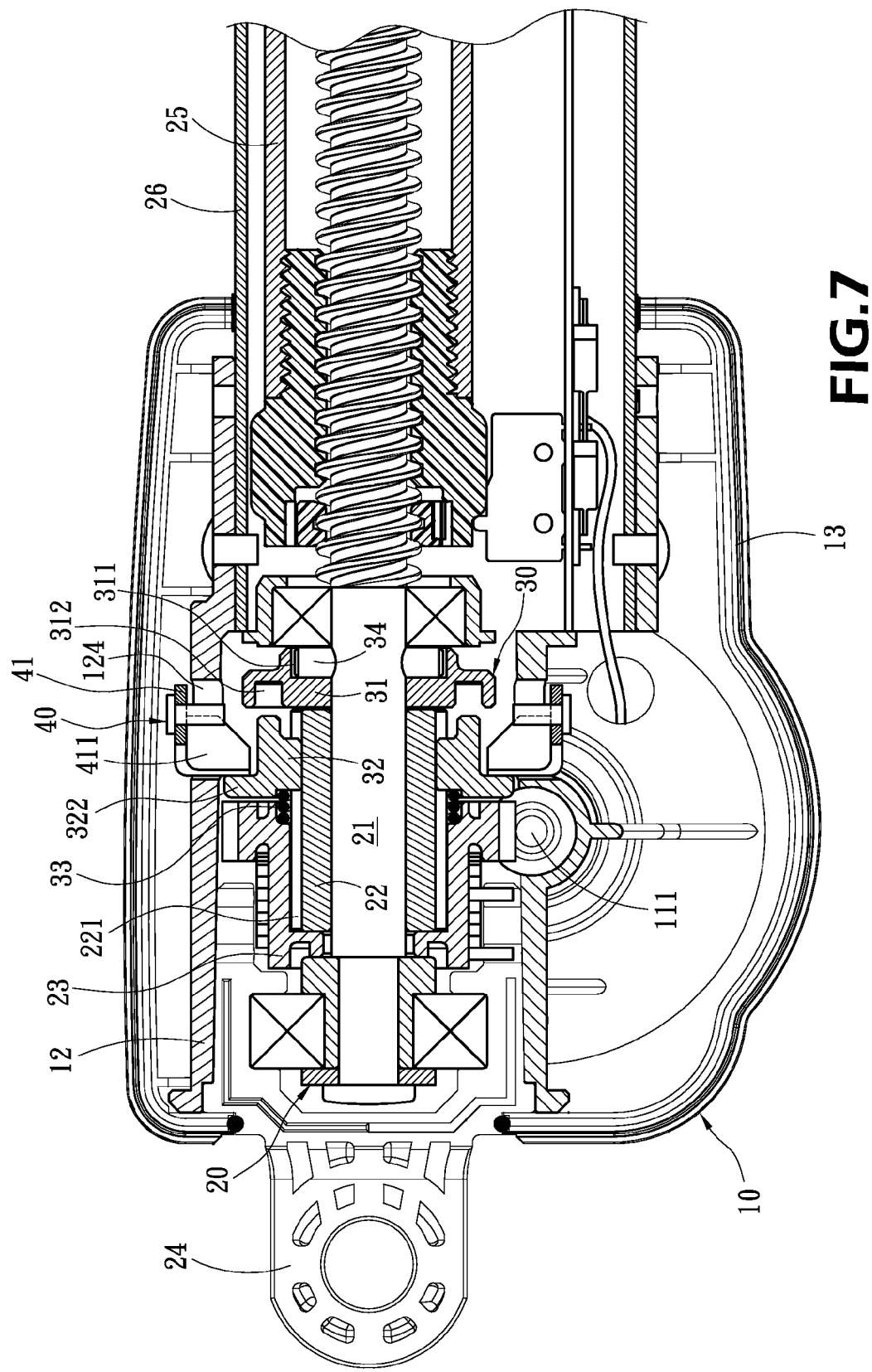
FIG. 7 is a view showing the action for rapidly and inwardly releasing the telescopic tube of the present invention.

FIG. 6 is a view showing the action for pulling the pulling arm of the present invention, and FIG. 7 is a view showing the action for rapidly and inwardly releasing the telescopic tube of the present invention. When a patient is subjected to emergent medical treatment and the hospital bed should be put in a horizontal state, the cable 44 can be pulled to make the pulling arm to rotate by using the point pivotably connected to the base as the center of rotation. With both poking portions 411 pushing the clutch 32 toward one side of the worm gear 23, and with the third recesses 322 of the clutch 32 axially moving along the first projecting blocks 221 of the fixing sleeve 22, the second projecting blocks 321 can be removed from the second recesses 312 of the clutch base 31. At this time, the screw 21 does not interfere with the worm gear 23, such that the worm 21 can freely rotate within the fixing sleeve 22. As a result, when an axial pushing force (or the weight of the sickbed) is exerted to the telescopic tube 25, the screw 21 can rotate with respect to the telescopic tube 25 such that the telescopic tube 25 can be rapidly retracted into the outer tube 26, thereby to rapidly release the hospital bed.

According to the above, with the separate arrangement of the transmission means 20 and the clutch means 30 of the present invention, even the motor 11 is out of order, the screw 21 can still be disengaged from the worm gear 23, such that the screw 21 can be pushed by the telescopic tube 25 and rapidly rotate, thereby to retract the telescopic tube 25 into the outer tube 26. Further, since the short displacement between the clutch base 31 and the clutch 32 is sufficient to produce the clutching action, the total volume of the linear transmission means can be greatly reduced, which conforms to the demands of customers. Further, with the clutching action between the clutch base 31 and the clutch 32, the action force necessary for pulling is smaller, which increases the easiness in operation.

According to the above, the quick-releasing linear actuator of the present invent indeed achieves the desired effects by employing the above structures. Further, since the construction of the present invention has not been published or put to public use prior to applying for patent, the present invention involves the novelty and inventive steps, and conforms to the requirements for an invention patent.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A quick-releasing linear actuator, comprising:

a motor means comprising a motor and a base connected to the motor, wherein the motor is provided with a worm penetrating into the base;

a transmission means having a screw penetrating out of the base, a fixing sleeve connected to the screw, a worm gear connected to the fixing sleeve and engaged with the worm within the base, and a telescopic tube threadedly connected to the screw;

a clutch means provided within the base of the motor means, wherein the clutch means comprises a clutch base fixedly connected to the screw and a clutch connected to the fixing sleeve and axially movable with respect to the fixing sleeve; and a pulling arm means comprising a pulling arm pivotably connected to the outside of the base of the motor means, wherein the pulling arm is provided with poking portions corresponding to the clutch for controlling the clutching action between the clutch and the clutch base, wherein the screw of the transmission means is provided with a radial hole, an elongated groove is provided on one side of the clutch base of the clutch means, and an insertion pin is inserted into the radial hole and received in the elongated groove.

2. The quick-releasing linear actuator according to claim 1, wherein the motor means further comprises a lower cover for covering the motor and one side of the base and an upper cover for covering the other side of the base.

3. The quick-releasing linear actuator according to claim 2, wherein the top of the upper cover is formed with a projecting portion, and the center of the projecting portion is provided with a through hole corresponding to the pulling arm of the pulling arm means, and the through hole is covered with a cap.

4. The quick-releasing linear actuator according to claim 1, wherein the outer periphery of the fixing sleeve of the transmission means is provided with a plurality of first projecting blocks, and the interior of the shaft hole of the worm gear is provided with a plurality of first recesses corresponding to the first projecting blocks.

5. The quick-releasing linear actuator according to claim 1, wherein one side of the clutch base of the clutch means is circumferentially provided with a plurality of second recesses, and the clutch is provided with a plurality of second projecting blocks on the side surface facing the clutch base to correspond to the second recesses.

6. The quick-releasing linear actuator according to claim 1, wherein the clutch means further comprises an elastic element provided between the end surfaces of the clutch and the worm gear.

7. The quick-releasing linear actuator according to claim 6, wherein the elastic element is a spiral compressing spring.

8. The quick-releasing linear actuator according to claim 1, wherein the pulling arm of the pulling arm means is U-shaped, and both sides of the open end thereof are provided with a poking portion, respectively.

9. The quick-releasing linear actuator according to claim 1, wherein the pulling arm means further comprises a fixing piece fixedly connected to the pulling arm and an elastic body connected to the pulling arm and the base at both ends.

10. The quick-releasing linear actuator according to claim 9, wherein the back of the fixing piece is provided with a groove into which one end of a cable is inserted.

\* \* \* \* \*